United States Patent
Kim

(10) Patent No.: US 6,901,138 B2
(45) Date of Patent: May 31, 2005

(54) DIGITAL COMMUNICATION SYSTEM USING TELEPHONE LINE AND INITIALIZING METHOD THEREOF

(75) Inventor: Tae-Yong Kim, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 10/356,957

(22) Filed: Feb. 3, 2003

(65) Prior Publication Data

US 2003/0194068 A1 Oct. 16, 2003

(30) Foreign Application Priority Data

Apr. 11, 2002 (KR) ........................................ 2002-19668

(51) Int. Cl.[7] ............................................ H04M 11/00
(52) U.S. Cl. ................. 379/93.32; 379/93.28; 379/93.08
(58) Field of Search ........................... 379/93.01, 93.08, 379/93.28–93.34, 347, 395; 375/222, 265, 231, 297, 345; 370/352, 503

(56) References Cited

U.S. PATENT DOCUMENTS

| | | | |
|---|---|---|---|
| 6,295,343 B1 * | 9/2001 | Hjartarson et al. | 379/93.05 |
| 6,728,366 B1 * | 4/2004 | Barkaro et al. | 379/347 |
| 2003/0076906 A1 * | 4/2003 | Mujica | 375/345 |

FOREIGN PATENT DOCUMENTS

WO   WO 0139384 A1   5/2001

* cited by examiner

*Primary Examiner*—Wing F. Chan
(74) *Attorney, Agent, or Firm*—F. Chau & Associates, LLC

(57) ABSTRACT

Disclosed is an initializing method of an xDSL modem in which a gain of an amplifier for the reception is set to the maximum to detect a received signal when a communication channel is established and to determine whether, after requesting to establish the communications channel, the received signal is noise or a real xDSL signal.

13 Claims, 4 Drawing Sheets

DIGITAL COMMUNICATION SYSTEM USING TELEPHONE LINE AND INITIALIZING METHOD THEREOF

BACKGROUND

1. Field of the Invention

The present invention relates to a communication system which transmits and receives data using a digital subscriber line (DSL), and more particularly, to a communication system capable of controlling amplitude of a received signal, and a controlling method thereof.

2. Discussion of Related Art

In recent years, as demands increase for broadband communications such as on the Internet and personal computers are widely used, there is a need for a communication method that high speed data communications can be realized and installation costs and usage costs can be reduced. To meet these demands for high speed communications, there has been provided an xDSL (digital subscriber line and its variations) communication method that digital data communications are performed using a general copper telephone line installed in every office and at home.

An xDSL communication system, which generally indicates all types of communication method using the telephone line, includes a High data-rate DSL (HDSL) system substituting for T1 line, an Symmetric DSL (SDSL) system substituting for T1 or E1 using a single twist-pair copper line, an Asymmetric DSL (ADSL) system capable of transmitting a large amount of data in a public switched telephone network (PSTN) environment, and so on.

FIG. 1 is a block diagram illustrating an ADSL modem used in an ADSL system. An ADSL modem 10 includes an amplifier 11 for amplifying a signal received through a telephone line 1, an analog-to-digital converter (ADC) 12 for converting an analog signal outputted from the amplifier into a digital signal, a digital signal processor (DSP) or discrete multi-tone (DMT) controller 13, and a host controller 14. The DMT controller 13 demodulates a modulated digital signal in a DMT way to restore an original signal, which is provided to the host controller 14, and modulates a signal outputted from the host controller 14 in the DMT way. The host controller 14 controls a general operation of the ADSL modem 10. The ADSL modem 10 further includes a digital-to-analog converter (DAC) 15 for converting a digital signal outputted from the digital signal processor 13 into an analog signal, and an amplifier 16 for amplifying the analog signal outputted from the digital-to-analog converter 15 up to a predetermined level and outputting an amplified analog signal to the telephone line 1.

A maximum distance between a central office and a remote terminal in which a signal can be normally transmitted without using a repeater in an ADSL system is 5.5 Km. Owing to noise on a telephone line and attenuation according to the distance, although the central office transmits a signal with a constant intensity, the intensity of the signal which arrives at the ADSL modem 10 varies with the distance between the central office and the ADSL modem 10. In other words, an ADSL modem located from a distance to the central office receives a weaker signal than an ADSL modem located near the central office. Accordingly, the ADSL modem 10 is essentially provided with the amplifier 11 for amplifying the signal received through the telephone line 1.

However, a gain of the amplifier 11 provided for the ADSL modem is generally fixed at a constant value with no relation to the distance between the central office and the ADSL modem 10. Accordingly, if the gain of the amplifier 11 is set to a large value, the ADSL modem located a large distance from the central office can compensate for the attenuation due to the distance, thereby restoring an original signal. Whereas the amplitude of a signal outputted from the amplifier of the ADSL modem located near the central office may not be within a quantization range (+L to −L) of the analog-to-digital converter 12. As a result, it is impossible for the ADSL modem located near the central office to correctly restore the original signal.

FIG. 2 illustrates exemplary waveforms of signals outputted from the amplifier 11 of the ADSL modem 10. In the case where the central office transmits a signal with a constant intensity, and ADSL modems are disposed at different distances from the central office, intensities (e.g., amplitude) of signals received at the ADSL modems are different depending on the distance between the central office and the respective ADSL modem 10. For instance, a signal that is outputted from the amplifier 11 of the ADSL modem located near the central office is referred to as (c), and a signal that is outputted from the amplifier 11 of the ADSL modem located from a distance to the central office is referred to as (a). When the quantization range is between +L and −L, signals, for instance, signals (a) and (b), of which maximum amplitude stay within the quantization range (+L to −L) can be correctly restored to the original signal by the digital signal processor 13. However, a signal, for instance, signal (c) deviating from the quantization range (+L to −L) cannot be correctly restored to the original signal. This problem is not limited to the ADSL modem but is applicable to all xDSL type modems.

Signal modulation technologies of the xDSL modem generally include a Carrierless Amplitude Phase (CAP) Modulation, a Discrete Multi-tone (DMT) method, a 2Binary 1Quaternary (2B1Q) method, and a Quadrature Amplitude Modulation (QAM). The QAM method is also called a vertical amplitude modulation, and was first developed in the middle of 1990s by the AT&T Bell research center, and adopted as an analog signal transmission standard at the American National Standards Institute (ANSI), the European Telecommunications Standards Institute (ETSI), the International Telecommunications Union (ITU). Since the QAM method uses a band below 3,300 Hz, it is characterized in that it can be used for exchange line or released line and management of multipoint network is available.

The CAP method is a kind of time division methods. One of the first CAPs was commercialized by the BELL Atlantic company of the U.S. in 1993, and it separates and uses a single carrier wave signal sound. Typically, the CAP modulates a digital vertical signal sound and uses two digital cross line band filters having a phase difference of P/2 by the same amplitude and phase response. The CAP method has advantages such as wide bandwidth and ease of application.

The 2B1Q method is a digital transmission method that is widely being used in HDSL, CSU, ISDB transmission devices, an SDSL system, and so forth. The 2B1Q has a characteristic of symmetric transmitting and receiving speed. The 2B1Q method which typically modulates the amplitude of a single wave to transmit data was adopted as transmission standards in the ANSI, ETSI and ITU.

The DMT method, which was first commercialized by the Bell Core company of U.S. in 1993, was adopted as standard of digital transmission in the ANSI, ETSI and ITU. The DMT method is a parallel transmission technology using a plurality of narrow band carrier waves, and it has a better noise suppression function and a less interference phenomenon on other communications line than the CAP method. According to ANSI T1.413 regulation of the DMT, a frequency band of 0–1.104 MHz is divided into 256 sub-channels each having the same size, in which 26 kHz (#6) to 134 kHz (#31) are allocated to an upstream and 142 kHz (#33) to 1.100 kHz (#255) to a downstream. Attenuation of the copper line is low in a relatively low frequency band, and a signal to noise ratio (SNR) is good. Generally, the DMT is used in a communication system at a configuration higher than 10 bits/Hz. In case that the line is not at good configuration (e.g., approximately less than 4 bits/Hz), the DMT accepts signals of relatively low SNR to lower the modulation function and remove unnecessary noise.

As described above, the DMT modulation method divides a frequency channel in use into sub-channels each having the same sized interval (e.g., 4 kHz). Here, each of divided sub-channels is called "tone." When communications start between a central office and an ADSL modem, the central office transmits signals having the same intensity to tones, respectively. However, since a signal passing through communication lines (or telephone line) is influenced by an Additive White Gaussian Noise (AWGN), intensities of the signals received in the ADSL modem are different at every tone. To this end, it is not clear whether the received signal at the ADSL modem is a real ADSL signal or noise.

As such, it is desirable to develop a method for determining whether a signal received at the ADSL modem is noise or a real xDSL signal by controlling a gain of an amplifier depending on amplitude of a signal received at an ADSL modem. Therefore, there exists a need for an xDSL modem capable of controlling a gain of an amplitude depending on amplitude of a received signal and of determining whether a signal received at an ADSL modem is noise or a real xDSL signal.

SUMMARY OF THE INVENTION

The present invention is directed to an initializing method of a digital communication system using a telephone line. According to an embodiment of the present invention, the initializing method includes the steps of: (a) setting to a predetermined maximum value a gain of an amplifier for amplifying a signal received through the telephone line; (b) transmitting a signal for requesting to establish a communications channel; (c) reducing the gain of the amplifier to a predetermined level when a peak value of the received signal outputted from the amplifier during a predetermined time period is larger than a reference value; (d) converting the received signal in a time-domain to a signal in a frequency-domain; (e) detecting a frequency of a signal that has a greatest intensity among signals in the frequency-domain; and (f) repeating the steps (b) to (e) until the signals of detected frequencies within a desired frequency band are inputted by a predetermined number.

Preferably, the amplifier is a programmable gain amplifier, and the signal received through the telephone line is an analog signal.

In this embodiment, the initializing method, after performing the step (a), further comprising the step (a-1) converting the received signal outputted from the amplifier to a digital signal.

The step (f) includes the steps of: determining whether the detected frequencies are within the desired frequency band; returning to the step of transmitting the signal when the detected frequency is not within the desired frequency band; and returning to the step of transmitting the signal until the signal within the desired frequency band is inputted by a predetermined number when the detected frequencies are within the desired frequency band.

In a preferred embodiment, the digital communication system employs a data modulation method of discrete multi-tone (DMT).

According to another embodiment of the present invention, a digital communication system using a telephone line includes: a controller for outputting a signal requesting to establish a communication channel; an amplifier for controlling an amplitude of an analog signal received through the telephone line according to a gain of the amplifier; and an analog-to-digital converter for converting an amplitude-controlled analog signal to a digital signal. In particular, the controller includes: a gain controller for receiving the digital signal and decreasing the gain of the amplifier when a peak value of the digital signals is larger than a reference value; and a fast Fourier transformer for transforming the digital in a time-domain to signals in a frequency-domain. Also, the controller outputs the signal for requesting to establish the communication channel until a predetermined number of signals having detected frequencies in a desired frequency band are inputted. Preferably, the amplifier is a programmable gain amplifier.

BRIEF DESCRIPTION OF THE DRAWINGS

The accompanying drawings, which are included to provide a further understanding of the invention and are incorporated in and constitute a part of this application, illustrate preferred embodiment(s) of the invention together with the description, wherein.

DETAILED DESCRIPTION OF PREFERRED EMBODIMENTS

Reference will now be made in detail to preferred embodiments of the present invention, examples of which are illustrated in the accompanying drawings of FIGS. 3 and 4.

Figure 3:
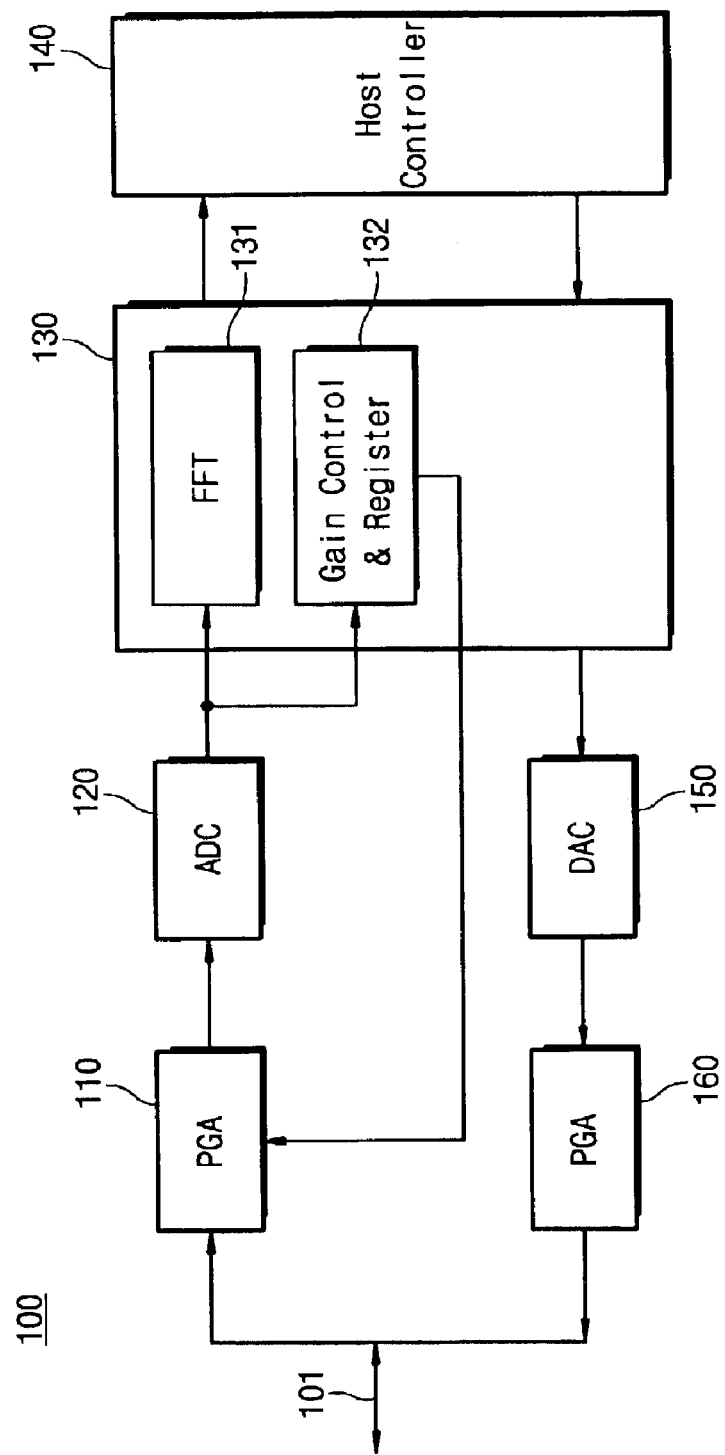
FIG. 3 is a block diagram of an ADSL modem according to a preferred embodiment of the present invention.

FIG. 3 is a block diagram of an ADSL modem according to a preferred embodiment of the present invention. An ADSL modem 10 includes a programmable gain amplifier (PGA) 110 for reception of a signal, an analog-to-digital converter (ADC) 120, a digital signal processor 130, a host controller 140, a digital-to-analog converter (DAC) 150, and a programmable gain amplifier 160 for transmission of the signal.

The programmable gain amplifier 110 amplifies an analog signal received from a central office (not shown) through a telephone line 101 and outputs an amplified analog signal. The programmable gain amplifier 110, for instance, has gains of 0 to about 42 dB at an interval of about 0.4 dB, and is controlled by a control signal from the digital signal processor 130. At an initial stage, the gain of the amplifier 110 is set to about 42 dB.

The analog-to-digital converter 120 converts an analog signal outputted from the amplifier 110 into a digital signal.

The digital signal processor 130 receives the digital signal outputted from the analog-to-digital converter 120 to restore an original signal that was transmitted from the central office, and provides a restored original signal to the host controller 140. In particular, the digital signal processor 130 in this embodiment includes a gain control and register 132 and a fast Fourier transform (FFT) unit 131. The gain control and register 132 outputs a control signal for controlling gain of the gain amplifier 110 if, when communications between the central office and the ADSL modem 100 are initiated, a digital signal outputted from the analog-to-digital converter 120 is greater than a preset threshold value. The FFT unit 131 transforms the digital signal outputted from the analog-to-digital converter 120 to a digital signal in time-domain. Also, although not shown in the drawings, the digital signal processor 130 further includes a time-domain equalizer (TEQ) for processing a received signal, a frequency-domain equalizer (FEQ), a quadrature amplifier modulation (QAM) decoder and deframer, a framer for processing a transmission signal, a QAM encoder, an inverse fast Fourier transformer (IFET), and so forth.

The digital signal processor 130 detects a frequency that has the greatest intensity among frequencies of signals outputted from the fast Fourier transformer 131 and determines whether a received signal is noise or data signal from a detected frequency.

The digital-to-analog converter 150 converts a digital signal outputted from the digital signal processor 130 into an analog signal suitable for the transmission of a signal through the telephone line 101. The programmable gain amplifier 160 amplifies the analog signal outputted from the digital-to-analog converter 150 by a preset gain and outputs an amplified analog signal through the telephone line 101.

Gain control operation and noise determining operation of the digital signal processor 130 will now be in detail described. FIG. 4 is a flow chart showing an operation procedure of the digital signal processor 130 shown in FIG. 3 when the central station starts to communicate with an ADSL modem. In step S200, a gain of the programmable gain amplifier 110 is set to a predetermined maximum gain (e.g., about 42 dB) by the gain controller of the digital signal processor 130 and a control signal from the gain control and register 132. In step S201, the digital signal processor 130 sets parameters that are necessary for a protocol of the ADSL communications.

In step S202, a signal requesting to establish a communication channel is outputted from the digital signal processor 130. To establish the communication channel, the signal passes through the digital-to-analog converter 150 and the amplifier 160, and is transmitted to the central office. The central office that has received the signal requesting to establish the communication channel establishes the communication channel for communications with the ADSL modem 100, and initiates communications. In an initial stage, the central office transmits a signal for confirming a status of a communication line. For instance, a regulation, ANSI T1.413 of the DMT transmits a data signal at a bandwidth of 4 kHz with 256 sub-channels, i.e., tones. The programmable gain amplifier 110 of the ADSL modem 100 amplifies a received signal at a preset maximum gain. The analog-to-digital converter 120 converts an analog signal outputted from the amplifier 110 into a digital signal.

In step S203, the gain control and register 132 receives the digital signal outputted from the analog-to-digital converter 120 during a predetermined time (t), and detects a peak value of the received signal.

Figure 1:
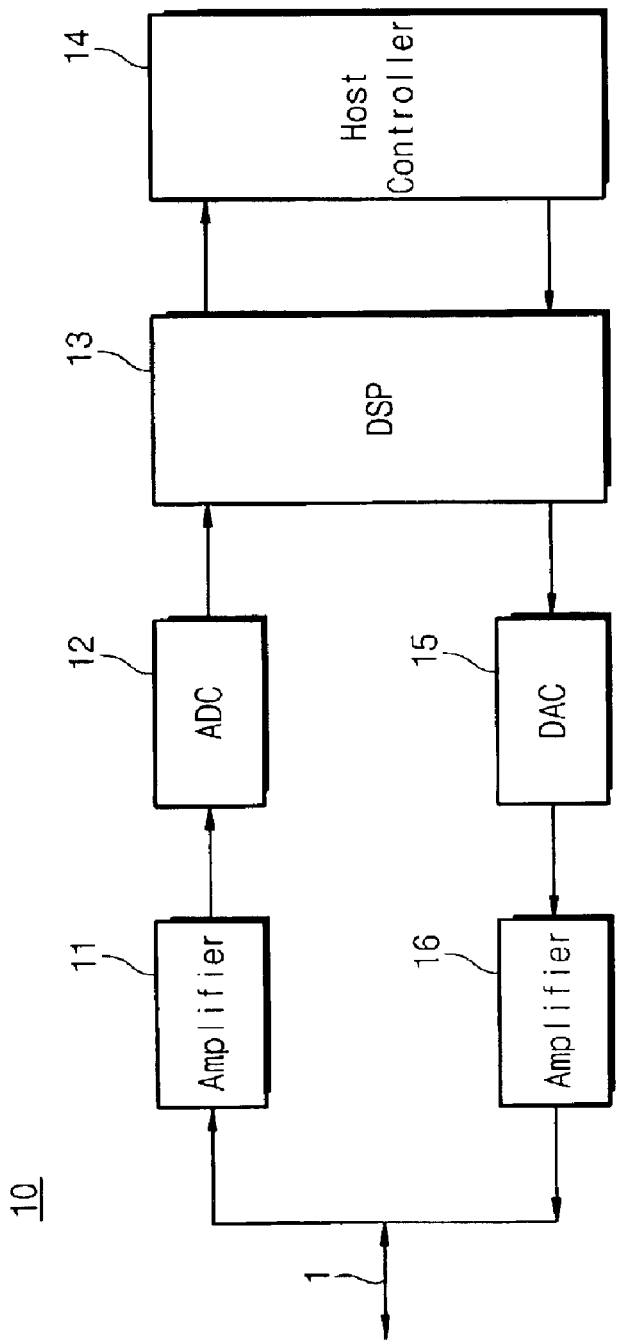
FIG. 1 is a block diagram of a conventional ADSL modem.
Figure 2:
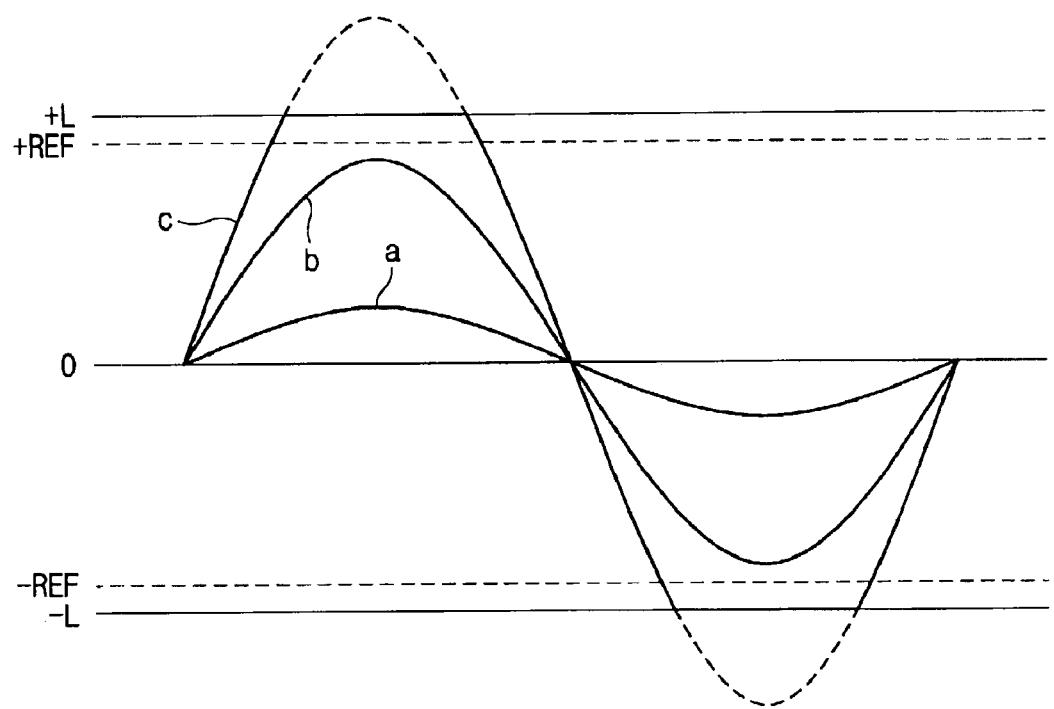
FIG. 2 illustrates exemplary waveforms of signals outputted from an amplifier of an ADSL modem.

In step S204, it is determined whether a detected peak value is within a reference range. Here, the reference range is set to a range that is slightly smaller than a quantization range of the analog-to-digital converter 120. For example, when the quantization range of the analog-to-digital converter 120, as shown in FIG. 2, is +L to −L, the reference range is set at +REF to −REF. Accordingly, if the peak value is larger than +REF or smaller than −REF, it is determined that the peak value is not within the reference range. If the detected peak value is not within the reference range, its control proceeds to step S205, whereas if the detected peak value is within the reference range, the process proceeds to step S207.

In step S205, the gain control and register 132 reduces the gain of the programmable gain amplifier 10 by a predetermined amount (e.g., about 0.4 dB). In step S206, the gain control and register 132 is deferred by a predetermined time (d), and controls the digital signal processor 130 to perform a next operation.

In step S207, the fast Fourier transformer 131 of the digital signal processor 130 transforms the digital signal outputted from the analog-to-digital converter 120 in a time-domain into a signal in a frequency-domain.

During initialization, the central office transmits downstream signals having the same intensity as tones, but ADSL modems at different locations receive signals with different intensities. Generally, the digital signal processor 130 of the ADSL modem 100 is designed to in advance obtain information on a tone corresponding to a signal having the greatest intensity among the received signals from the central office. Accordingly, if, after the digital signal processor 130 transmits the signal requesting to establish the communication channel and then receives signals from the central offices, the tone of a signal having the greatest intensity among the received signals from the central office is to the same as an anticipated tone, the digital signal processor 130 regards the received signal as a signal received from the central office. Meanwhile, if the tone of a signal having the greatest intensity among the received signals from the central office is different than the anticipated tone, the digital signal processor 130 regards the received signal as noise.

Next, the digital signal processor 130 determines whether the received signal is noise or a normally received signal.

In step S208, the digital signal processor 130 detects a tone of a signal having the greatest intensity among signals in the frequency-domain. In step S209, the digital signal processor 130 determines whether or not a detected tone is one anticipated to have the greatest intensity. As a result of the determining step, if the detected tone is one anticipated to have the greatest intensity, its control proceeds to step S210, and if the detected tone is not the one anticipated to have the greatest intensity, its control returns to step S202.

In step S210, the digital signal processor 130 increases the value of a parameter 'i' by 1. In step S211, the digital signal processor 130 determines whether or not the value of the parameter 'i' accords with a preset value 'n'. If the value of the parameter 'i' accords with the preset value 'n', it is regarded that signals are normally received from the central office, so that the initializing step is ended. If the value of the parameter 'i' does not accord with the preset value 'n', it returns to step S202.

Steps S210 and S211 are performed to prevent a desired tone signal from being temporarily received at the greatest intensity owing to noise notwithstanding that the central office does not transmit a response signal normally. In other words, the digital signal processor 130 is designed not to recognize an establishment of a normal communication channel until a signal having the greatest intensity among the received signals is received by a predesignated number (i.e., number of n) as a desired tone signal. If the signal having the greatest intensity among the signals received from the central office is not the desired tone signal or the desired tone signal is not inputted by a certain number, it returns to step S202, and the digital signal processor 130 requests to establish a communication channel to the central office.

While the above embodiments describe an ADSL modem, one skilled in the art appreciates that the present invention may be applied to all types of xDSL modems, such as the RADSL (Rate Adaptive Digital Subscriber Line), the MVL (Multiple Virtual Line), the MDSL (Multi-rate DSL), the SDSL (Symmetric DSL), the HDSL (High-bit-rate DSL), the VDSL (Very-high-speed DSL) and the UADSL (Universal Asymmetric DSL).

Also, it is apparent to those skilled in the art that the gain of the programmable gain amplifier 160 for the transmission is controllable based on the method for controlling the gain of the programmable gain amplifier 110 for the reception.

Figure 4:
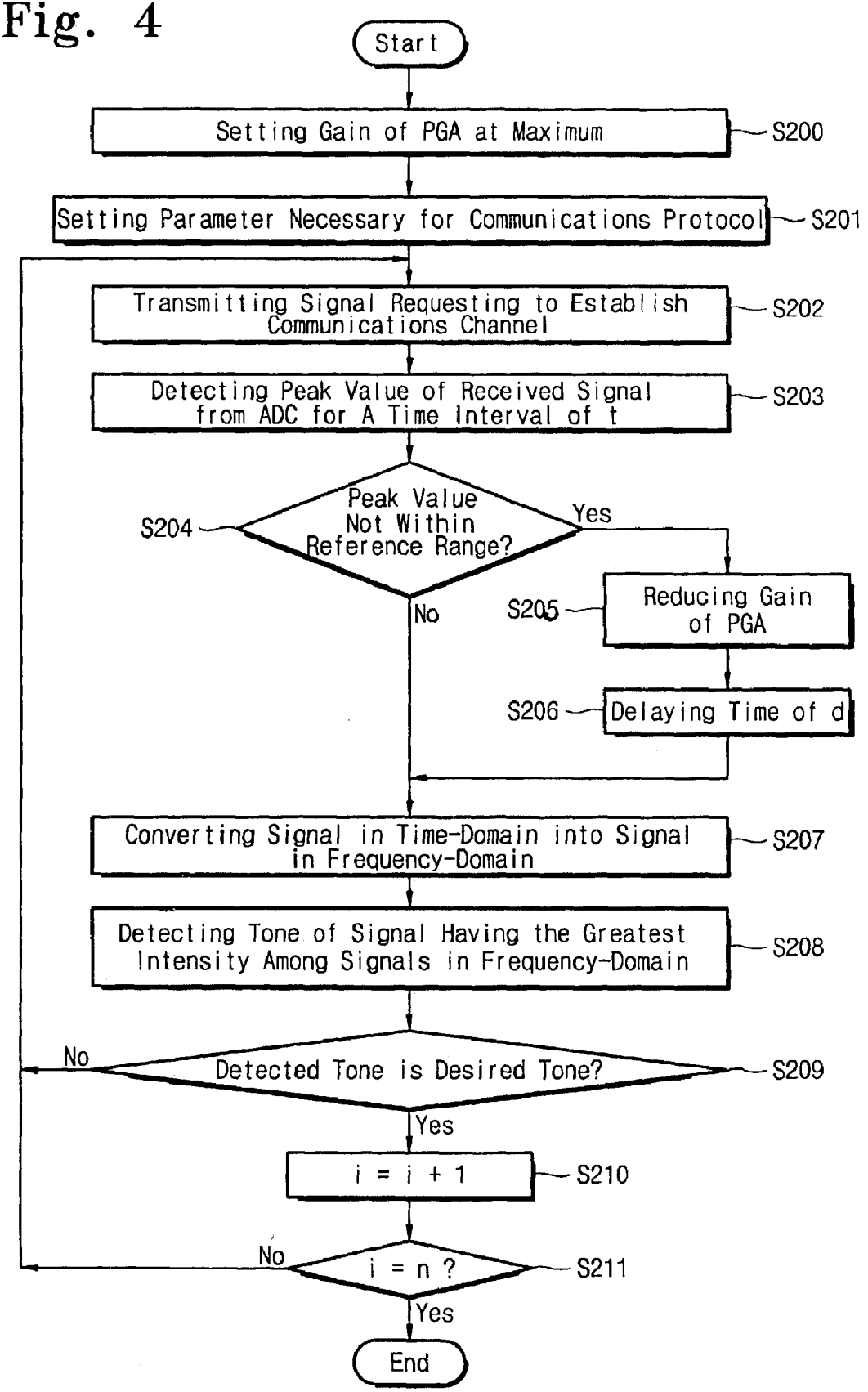
FIG. 4 is a flow chart showing an operation of a digital signal processor shown in FIG. 3 when a central station communicates with an ADSL modem.

Meanwhile, in case that the amplitude of a signal outputted from the amplifier 110 exceeds the quantization range of +L to −L of the analog-to-digital converter 120 notwithstanding that the gain of the programmable gain amplifier 110 is controlled, it is apparent to those skilled in the art that the flow chart shown in FIG. 4 may be altered to repeat the steps S203 to S206 such that the gain of the amplifier 110 further decreases.

As described previously, the gain of a amplifier for the reception is set to a predetermined maximum at an initial stage, and then to decrease according to the amplitude of the signal outputted from the amplifier for the reception. Accordingly, the received signal is amplified to the maximum, and does not distort the received signal. Also, the xDSL modem of preferred embodiments of the present invention can easily determine whether or not, after requesting to establish a communication channel, the received signal is noise or a real xDSL signal.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An initializing method of a digital communication system using a telephone line, the method comprising the steps of:
   (a) setting to a predetermined maximum value a gain of an amplifier for amplifying a signal received through the telephone line;
   (b) transmitting a signal for requesting to establish a communications channel;
   (c) reducing the gain of the amplifier to a predetermined level when a peak value of the received signal outputted from the amplifier during a predetermined time period is larger than a reference value;
   (d) converting the received signal in a time-domain to signals in a frequency-domain;
   (e) detecting a frequency of a signal that has the greatest intensity among the signals in the frequency-domain; and
   (f) repeating the steps (b) to (e) until the signals of detected frequencies within a desired frequency band are inputted by a predetermined number.

2. The initializing method of claim 1, wherein the amplifier is a programmable gain amplifier.

3. The initializing method of claim 1, wherein the signal received through the telephone line is an analog signal.

4. The initializing method of claim 3, after performing the step (a), further comprising the step (a-1) converting the received signal outputted from the amplifier to a digital signal.

5. The initializing method of claim 1, wherein the step (f) comprises the steps of:
   determining whether the detected frequencies are within the desired frequency band;
   returning to the step of transmitting the signal when each of the detected frequencies is not within the desired frequency band; and
   returning to the step of transmitting the signal until a predetermined number of signals within the desired frequency band are inputted when the detected frequencies are within the desired frequency band.

6. The initializing method of claim 1, wherein the digital communication system employs a data modulation method of discrete multi-tone (DMT).

7. The initializing method of claim 6, wherein the desired frequency band is a frequency band corresponding to a desired tone among a plurality of tones.

8. A method of initializing a digital communication system using a telephone line, the method comprising the steps of:
   (a) setting to a predetermined maximum value a gain of an amplifier for amplifying an analog signal received through the telephone line;
   (b) transmitting a signal for requesting to establish a communication channel;
   (c) converting the analog signal to a digital signal;
   (d) detecting a peak value of digital signals during a predetermined time;
   (e) comparing a detected peak value with a reference value;
   (f) reducing the gain of the amplifier to a predetermined level when the detected peak value is larger than the reference value;
   (g) converting the digital signals in a time-domain to signals in a frequency-domain;
   (h) detecting a frequency of a signal that has the greatest intensity among the signals in the frequency-domain;
   (i) determining whether a detected frequency is within a desired frequency band;
   (j) returning to the step of transmitting the signal when the detected frequency is within the desired frequency band; and
   (k) repeating the steps (b) to (j) until a predetermined number of signals in the detected frequency band are inputted when the detected frequency is within the desired frequency band.

9. The initializing method of claim 8, wherein the amplifier is a programmable gain amplifier.

10. The initializing method of claim 8, wherein the digital communication system employs a data modulation method of discrete multi-tone (DMT).

11. A digital communication system using a telephone line, the system comprising:

a controller for outputting a signal requesting to establish a communication channel;

an amplifier for controlling an amplitude of an analog signal received through the telephone line according to a gain of the amplifier; and an analog-to-digital converter for converting an amplitude-controlled analog signal to a digital signal, wherein the controller comprises:

a gain controller for receiving the digital signal and decreasing the gain of the amplifier when a peak value of the digital signals is larger than a reference value; and a fast Fourier transformer for transforming the digital signals in a time-domain to signals in a frequency-domain, and wherein the controller outputs the signal for requesting to establish the communication channel until a predetermined number of signals having detected frequencies in a desired frequency band are inputted.

12. The digital communication system of claim 11, wherein the amplifier is a programmable gain amplifier.

13. The digital communication system of claim 8, wherein the digital communication system employs a data modulation method of discrete multi-tone (DMT).

* * * * *